(No Model.) 2 Sheets—Sheet 1.

D. & D. H. MARTIN.
MEAT OR VEGETABLE CUTTER.

No. 541,245. Patented June 18, 1895.

Witnesses
Victor J. Evans.
Chas. W. Boyd.

Inventors:
David Martin,
David H. Martin
by J. R. Littell, their Attorney

THE NORRIS PETERS CO., PHOTO-LITHO., WASHINGTON, D. C.

(No Model.) 2 Sheets—Sheet 2.
D. & D. H. MARTIN.
MEAT OR VEGETABLE CUTTER.

No. 541,245. Patented June 18, 1895.

Witnesses
Victor J. Evans.
Chas. W. Boyle.

Inventors:
David Martin,
David H. Martin,
by J. R. Littell
their Attorney

UNITED STATES PATENT OFFICE.

DAVID MARTIN AND DAVID H. MARTIN, OF HARRISBURG, PENNSYLVANIA.

MEAT OR VEGETABLE CUTTER.

SPECIFICATION forming part of Letters Patent No. 541,245, dated June 18, 1895.

Application filed March 14, 1895. Serial No. 541,710. (No model.)

*To all whom it may concern:*

Be it known that we, DAVID MARTIN and DAVID H. MARTIN, citizens of the United States, residing at Harrisburg, in the county of Dauphin and State of Pennsylvania, have invented a new and useful Meat or Vegetable Chopper, of which the following is a specification.

This invention relates to that class of devices for chopping or cutting meats or vegetables, which embody a reciprocating spring-actuated plunger carrying knives which operate in a containing vessel or drum.

The object of our improvements is to provide a simple and improved device of this character which will possess advantages in point of convenience, ease of adjustment and operation, durability, removability of parts, effectiveness, and general efficiency, which can be readily cleaned, and which can be conveniently used under various conditions and circumstances and without attachment to other objects.

Figure 1:
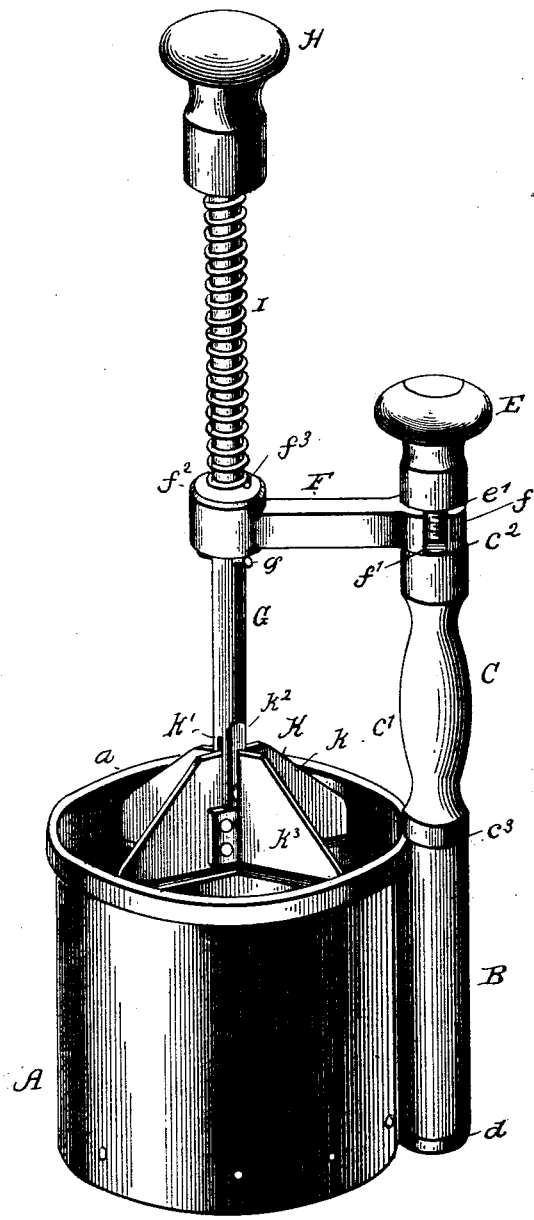
Figure 2:
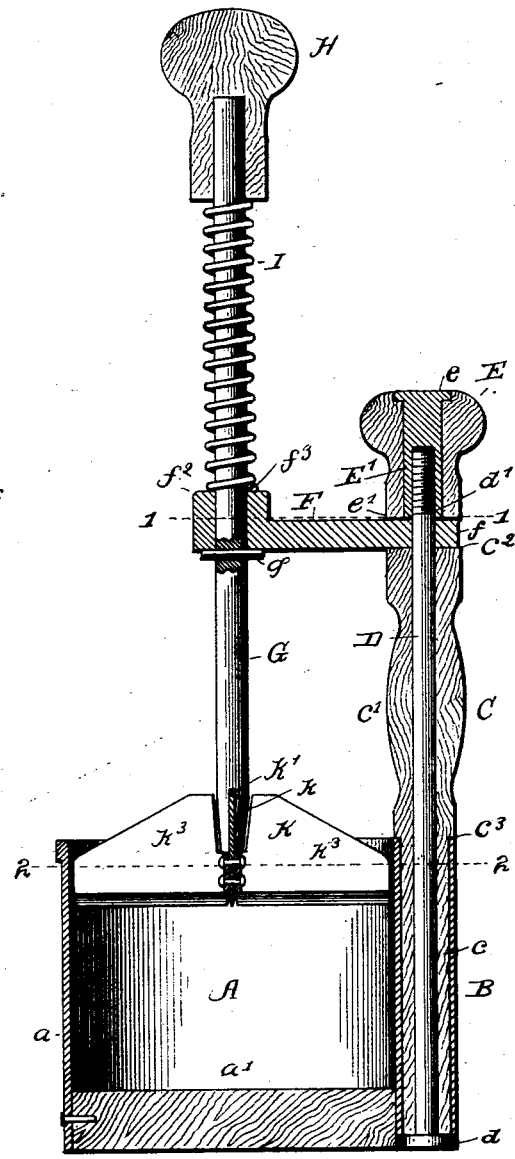
Figure 3:
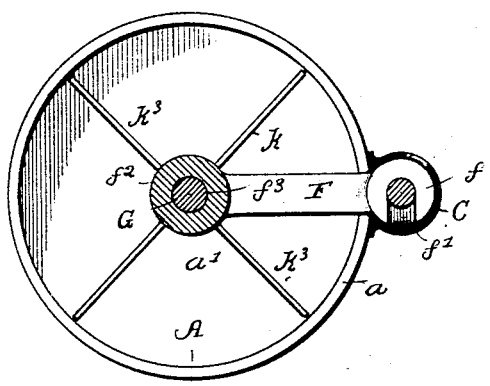
Figure 5:
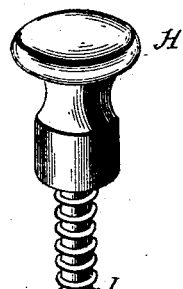
Figure 4:
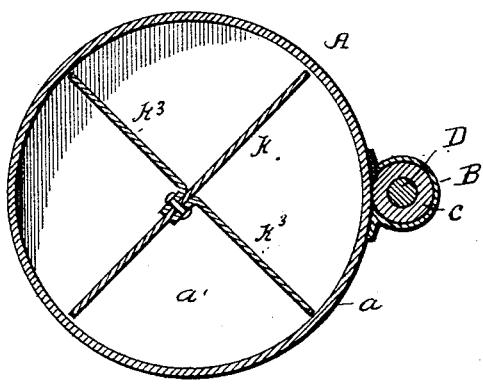
Figure 4:
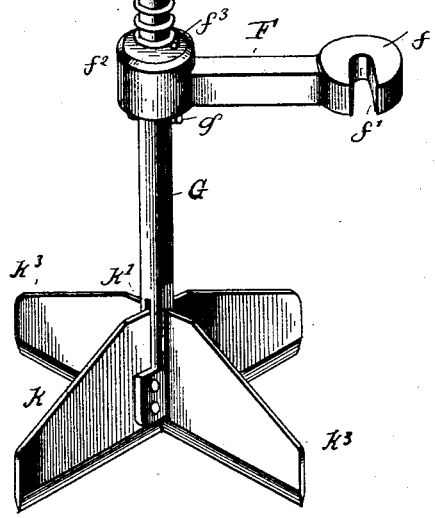

In the drawings, Figure 1 is a perspective view of our improved chopping device. Fig. 2 is a vertical transverse sectional view. Fig. 3 is a transverse horizontal sectional view taken on the line 1 1, Fig. 2. Fig. 4 is a transverse horizontal sectional view taken on the line 2 2, Fig. 2. Fig. 5 is a perspective view of the chopper and guide-bar removed.

Referring to the drawings, A designates the containing vessel or drum, which is preferably of circular or cylindrical shape and embodies the sides, $a$, and a bottom, $a'$. The sides $a$ are preferably formed of sheet metal and the bottom $a'$ is preferably formed of wood of suitable thickness to form a chopping-block, this wooden bottom disk being set up within the metallic sides with the latter secured to the periphery of the block.

Secured to the outer face of the sides $a$ is a vertical tubular casing, B, in which is set the corresponding lower cylindrical end portion, $c$, of a vertical post or standard, C. This post is preferably formed of wood and handle-shaped above the casing B, as shown at $c'$, and the top, $c^2$ of the post is preferably flat, as shown, to form a supporting shoulder for the guide-bar of the device. Below the handle-shaped portion $c'$, the post is preferably provided with a circumferential shoulder, $c^3$, which rests upon the top edge of the casing B.

D designates a bolt or rod, centrally provided in the post C and preferably running longitudinally through the same. The bottom end of said rod may be secured below the casing B by a nut or head, $d$, by which arrangement the post is firmly mounted in the casing. The top end, $d'$, of the rod or bolt, which projects from the top of the post or standard C, is threaded, and upon this threaded projecting end is mounted a removable knob, E. This knob is preferably formed of wood and embodies a bore, $e$, extending from its bottom upwardly in the knob, in which bore is set a metallic threaded nut, E'. The bottom edge, $e'$, of the knob is preferably flat or straight to correspond to the top edge $c^2$ of the post, and between the top of the post and the knob the guide-bar is adapted to be removably secured. This guide-bar, F, embodies an arm or cross-piece adapted to project laterally from the post C out over the vessel or drum A, and at its inner end it is provided with a head, $f$, adapted to be bound between the knob E and the top of the post C, this head being provided with a transversely-disposed recess, $f'$, running from its outer edge to the center, to accommodate the projecting top end $d'$ of the rod or bolt D. At its outer end, the guide-bar is provided with a head, $f^2$, having a vertical eye or opening, $f^3$, in which the cylindrical plunger or knife stem, G, is adapted to reciprocate. The plunger G is permanently connected to the guide-bar, and has laterally projecting pins or studs, $g$, at a point under the head $f^2$, to limit the upward movement of the plunger. At the top of the plunger, is secured a knob or head, H, preferably formed of wood, and between this knob and the head $f^2$, a coiled-spring, I, is mounted upon the plunger rod, against the tension of which spring the plunger is operated.

The knives, K, are carried upon the lower end of the plunger and are arranged in a radial series, as shown. These knives may be of any suitable or adapted construction and may be connected with the plunger in any desired manner, but we prefer to employ a double transverse knife, K, secured in a trasverse slot or recess, $k'$, in the flattened lower end, $k^2$, of the plunger, to which transverse double blade $k$ are bolted or secured corresponding right-angular blades, $k^3$ $k^3$.

When the plunger is at the limit of its upward stroke, the knives are within the top of the vessel or drum A, and in the downward stroke of the plunger the knives are centrally guided over the chopping-block or bottom $a'$.

The operation and advantages of our invention will be readily understood.

The machine can be conveniently and effectively operated by hand to cut various kinds of meats and vegetables, and for analogous uses; and when it is desired to remove the contents of the drum, or to clean the latter, the knob E may be adjusted to permit the removal of the guide-bar F, and the plunger rod and knives which it permanently carries, from the main device.

We claim—

1. A device of the class described, comprising the vessel or drum carrying at one side an upright projecting post or standard provided at its top with an adjustable knob, and a guide-bar or cross-piece removably secured be ween the top of said post and the knob and carrying at its outer end a vertically-moving plunger or stem having the knives, substantially as and for the purpose set forth.

2. A device of the class described, comprising the vessel or drum having upon its outer face the vertical tubular casing, the post or standard set and secured in said casing and provided at its top with an adjustable knob, the guide-bar or cross-piece removably secured between the top of said post and the knob and provided with an eye at its outer end, and the vertically-moving plunger or stem operating in said eye and carrying knives normally arranged within the vessel or drum, substantially as and for the purpose set forth.

3. A device of the class described, comprising the vessel or drum having at its outer face the vertical tubular casing, the post or standard set and secured in said tubular casing and having a threaded bolt projecting at its top, the adjustable knob operating upon said threaded bolt, the guide-bar or cross-piece provided with the recess $f'$ engaging the threaded bolt by means of which it is removably secured between the top of the post and the adjustable knob, and a vertically-moving plunger or stem carried by the outer end of the removable guide-bar and provided at its lower end with knives operating within the drum or casing, substantially as and for the purpose set forth.

4. The herein described improved meat and vegetable chopper, consisting of the vessel or drum having the chopping block $a'$ and provided at its outer face with the vertical tubular casing, the post or standard corresponding to and secured in said tubular casing and having the bolt or rod with the threaded projecting top end, the removable knob operating upon said threaded end of the bolt, the guide-bar or cross-piece provided at its inner head with the recess $f'$ embracing the projecting end of the bolt and with an eye or opening at its outer end, the guide-bar being thus adapted to be removably-secured between the top of the post and the adjustable knob, the plunger or stem operating within the eye at the outer end of the removably-secured guide-bar and carrying at its lower end the knives or cutters normally contained within the drum or casing and at its top end the head or knob and having the lateral stop-pins or studs, and the coiled-spring mounted upon the plunger between its knob or head and the guide-bar, substantially as and for the purpose set forth.

5. A device of the class described, comprising a vessel or drum having the bottom chopping-block $a'$ and provided at its outer face with the vertical tubular casing, a post or standard permanently secured in said casing and carrying at its top an adjustable knob working upon a threaded projecting bolt end, and a removable guide-bar or cross-piece removably mounted upon the top of said post and secured by said adjustable knob and permanently carrying at its outer end a vertically-moving spring-actuated plunger or stem provided with knives which normally operate within the vessel or drum, substantially as and for the purpose set forth.

In testimony whereof we affix our signatures in presence of two witnesses.

DAVID MARTIN.
DAVID H. MARTIN.

Witnesses:
JULIUS FLUSS,
A. BRACKENRIDGE.